(12) United States Patent
Shinohara et al.

(10) Patent No.: US 11,155,208 B2
(45) Date of Patent: Oct. 26, 2021

(54) IMAGE DISPLAY UNIT

(71) Applicant: Omron Corporation, Kyoto (JP)

(72) Inventors: Masayuki Shinohara, Nagaokakyo (JP); Yasuhiro Tanoue, Kyoto (JP); Gouo Kurata, Kawanishi (JP); Norikazu Kitamura, Osaka (JP); Tsuyoshi Arai, Koka (JP); Yuto Mori, Joyo (JP)

(73) Assignee: Omron Corporation, Kyoto (JP)

( * ) Notice: Subject to any disclaimer, the term of this patent is extended or adjusted under 35 U.S.C. 154(b) by 65 days.

(21) Appl. No.: 16/492,857

(22) PCT Filed: Apr. 3, 2018

(86) PCT No.: PCT/JP2018/014239
§ 371 (c)(1),
(2) Date: Sep. 10, 2019

(87) PCT Pub. No.: WO2018/190192
PCT Pub. Date: Oct. 18, 2018

(65) Prior Publication Data
US 2021/0078495 A1    Mar. 18, 2021

(30) Foreign Application Priority Data
Apr. 12, 2017    (JP) ............................. JP2017-079240

(51) Int. Cl.
*H04N 7/18*    (2006.01)
*B60R 1/00*    (2006.01)
(Continued)

(52) U.S. Cl.
CPC ................ *B60R 1/00* (2013.01); *B60R 11/04* (2013.01); *G02B 6/003* (2013.01); *G02B 6/0038* (2013.01);
(Continued)

(58) Field of Classification Search
CPC ..... B60R 1/00; B60R 11/04; B60R 2300/802; B60R 2300/205; G02B 6/0038;
(Continued)

(56) References Cited

U.S. PATENT DOCUMENTS

| 10,613,265 | B2* | 4/2020 | Shinohara | ............ G02B 6/0038 |
| 2005/0168695 | A1* | 8/2005 | Ooba | ....................... B60R 1/00 353/13 |

(Continued)

FOREIGN PATENT DOCUMENTS

| CN | 103003620 A | 3/2013 |
| CN | 204687853 U | 10/2015 |

(Continued)

OTHER PUBLICATIONS

Office Action in counterpart Chinese Patent Application No. 201880016847.5 dated Sep. 3, 2020 (14 pages).

(Continued)

*Primary Examiner* — Michael Lee
(74) *Attorney, Agent, or Firm* — Osha Bergman Watanabe & Burton LLP (57) ABSTRACT

In order to achieve an image display unit having excellent degree of freedom in designing the position of a display image, an image display unit (1A) is provided with: an imaging unit (10) configured to capture an image of a space to be viewed; an image display device (11) configured to display an image captured by the imaging unit (10) in a display area in real time; and an image forming unit configured to form an image in a space where there is no screen by projecting the image displayed by the image display device (11).

13 Claims, 8 Drawing Sheets

(51) Int. Cl.
*B60R 11/04* (2006.01)
*F21V 8/00* (2006.01)
*H04N 9/31* (2006.01)
*H04N 13/302* (2018.01)

(52) U.S. Cl.
CPC ............... *H04N 7/18* (2013.01); *H04N 9/315* (2013.01); *B60R 2300/205* (2013.01); *B60R 2300/802* (2013.01); *H04N 13/302* (2018.05)

(58) Field of Classification Search
CPC .......... G02B 6/003; H04N 7/18; H04N 9/315; H04N 13/302
USPC ........................................................ 348/148
See application file for complete search history.

(56) References Cited

U.S. PATENT DOCUMENTS

| | | | | |
|---|---|---|---|---|
| 2006/0215244 | A1* | 9/2006 | Yosha | G02B 27/0101 359/15 |
| 2013/0094245 | A1 | 4/2013 | Kanda et al. | |
| 2014/0307091 | A1* | 10/2014 | Chang | B60R 1/00 348/148 |
| 2015/0213767 | A1 | 7/2015 | Takagi | |
| 2017/0050564 | A1 | 2/2017 | Lv et al. | |
| 2017/0318221 | A1* | 11/2017 | Varonos | H04N 5/23238 |
| 2017/0322417 | A1* | 11/2017 | Sekiguchi | G02B 27/0172 |
| 2018/0003862 | A1 | 1/2018 | Benitez et al. | |
| 2018/0003963 | A1 | 1/2018 | Benitez et al. | |
| 2018/0003978 | A1 | 1/2018 | Benitez et al. | |
| 2018/0003999 | A1 | 1/2018 | Minano et al. | |
| 2018/0004000 | A1 | 1/2018 | Benitez et al. | |
| 2018/0101087 | A1* | 4/2018 | Shinohara | G02B 6/0051 |
| 2018/0146519 | A1 | 5/2018 | Osumi et al. | |
| 2018/0172993 | A1* | 6/2018 | Nill | G02B 27/0103 |
| 2019/0016263 | A1 | 1/2019 | Lv et al. | |
| 2019/0210526 | A1* | 7/2019 | Takiguchi | G02B 5/09 |
| 2019/0317266 | A1* | 10/2019 | Shinohara | G02B 6/0031 |

FOREIGN PATENT DOCUMENTS

| | | |
|---|---|---|
| CN | 107407817 A | 11/2017 |
| JP | H10-037252 A | 2/1998 |
| JP | H11-115546 A | 4/1999 |
| JP | 2003-339060 A | 11/2003 |
| JP | 2004-330873 A | 11/2004 |
| JP | 2007-240965 A | 9/2007 |
| JP | 2008-042235 A | 2/2008 |
| JP | 2011-186332 A | 9/2011 |
| JP | 2011-213184 A | 10/2011 |
| JP | 2014-149386 A | 8/2014 |
| JP | 2014-228314 A | 12/2014 |
| JP | 2015-071335 A | 4/2015 |
| JP | 2016-030507 A | 3/2016 |
| JP | 2017-049420 A | 3/2017 |
| WO | 2016/160099 A2 | 10/2016 |

OTHER PUBLICATIONS

International Search Report issued in corresponding Application No. PCT/JP2018/014239, dated Jun. 26, 2018 (2 pages).
Written Opinion issued in corresponding Application No. PCT/JP2018/014239, dated Jun. 26, 2018 (12 pages).
International Preliminary Report on Patentability issued in corresponding Application No. PCT/JP2018/014239, dated Jun. 26, 2018 (8 pages).

* cited by examiner

IMAGE DISPLAY UNIT

TECHNICAL FIELD

The present invention relates to an image display unit.

BACKGROUND ART

There have been proposed image display units for observing in real time the environment outside a space including a vehicle and the like. For example, Patent Document 1 discloses a technique for displaying, on a display surface (display screen) in a vehicle, a real-time image obtained by capturing, by an imaging unit, an area outside the vehicle which is in the driver's blind spot due to a pillar inside the vehicle.

The display device disclosed in Patent Document 2 is configured such that an image captured by an imaging unit is projected onto a holographic optical element by a projector unit, and the holographic optical element diffracts the image projected by the projector unit toward a viewer.

Patent Document 3 discloses an image display device that displays an image captured by an imaging unit that captures an area behind the vehicle and/or an area on the side of the vehicle, using a stereoscopic display. In the configuration disclosed in Patent Document 3, a display device for displaying a real-time image of an area behind the vehicle is attached to a position of a rearview mirror in the vehicle.

PRIOR ART DOCUMENTS

Patent Documents

Patent Document 1: Japanese Unexamined Patent Publication No. 201571335 (published on Apr. 16, 2015)

Patent Document 2: Japanese Unexamined Patent Publication No. 2011-213184 (published on Oct. 27, 2011)

Patent Document 3: Japanese Unexamined Patent Publication No. 2003-339060 (published on Nov. 28, 2003)

SUMMARY OF THE INVENTION

Problems to be Solved by the Invention

However, in the techniques disclosed in Patent Documents 1 to 3, an image is displayed on a fixed display screen, and therefore, the distance between a viewer and the display image is fixed. Therefore, it may be hard for the viewer to view the display image depending on the positional relationship between the viewer and the display screen.

An aspect of the present invention aims to achieve an image display unit having excellent degree of freedom in designing the position of a display image.

Means for Solving the Problem

In order to solve the above problems, an image display unit according to an aspect of the present invention includes an imaging unit configured to capture an image of a space to be viewed, an image display configured to display an image captured by the imaging unit in a display area in real time, and an image forming unit configured to form an image in a space where there is no screen by projecting the image displayed by the image display.

Effect of the Invention

According to one aspect of the present invention, it is possible to achieve an image display unit having excellent degree of freedom in designing the position of a display image.

MODE FOR CARRYING OUT THE INVENTION (Configuration of Image Display Unit)

Figure 1:
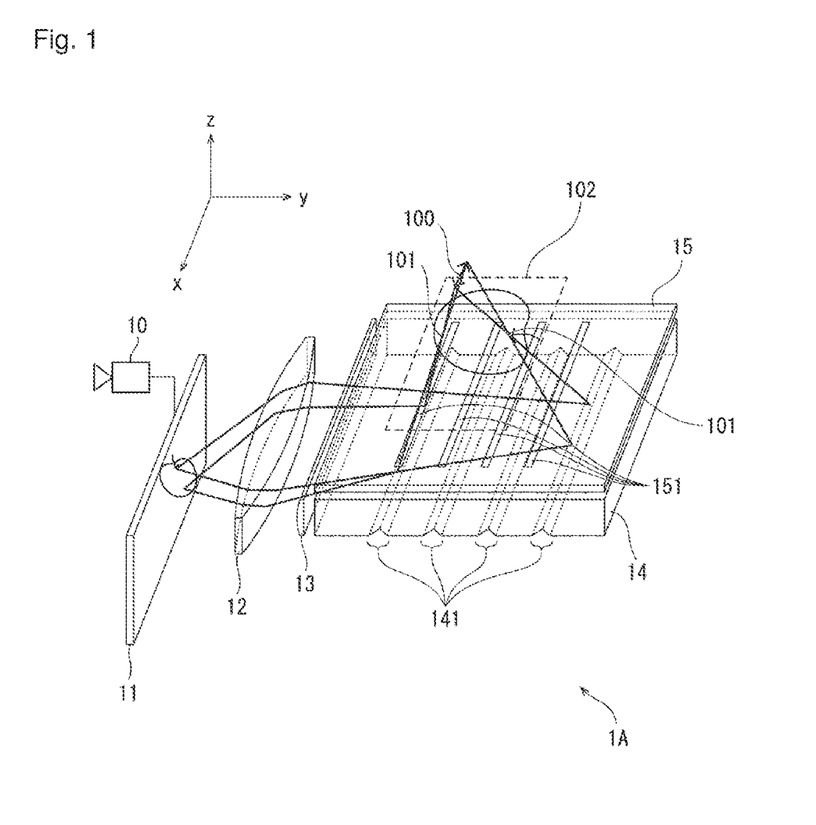
FIG. 1 is a schematic view showing a schematic configuration of an image display unit according to an embodiment of the present invention.
Figure 2:
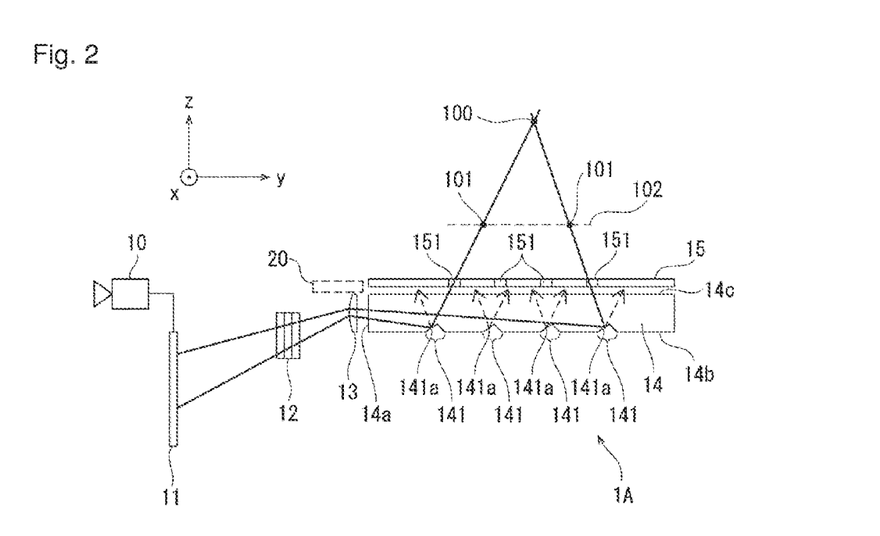
FIG. 2 is a side view showing the schematic configuration of the image display unit according to the embodiment of the present invention.

An example of a configuration of a main part of an image display unit 1A according to an embodiment of the present invention will be described with reference to FIGS. 1 and 2. FIG. 1 is a schematic view showing a schematic configuration of the image display unit 1A. FIG. 2 is a side view showing a schematic configuration of the image display unit 1A.

As shown in FIGS. 1 and 2, the image display unit 1A includes an imaging unit 10 configured to capture an image of a space to be viewed, an image display device 11 (image display), an image-forming lens 12, a collimating lens 13, a light guide plate 14, and a mask 15. An image forming unit in the image display unit 1A for forming an image displayed by the image display device 11 in a space includes the image-forming lens 12, the collimating lens 13, the light guide plate 14, and the mask 15.

Note that the image display device 11, the image-forming lens 12, the collimating lens 13, and the light guide plate 14 are arranged in this order along a Y axis direction. Further, the light guide plate 14 and the mask 15 are arranged in this order along a Z axis direction. Here, the longitudinal direction of an incoming surface 14a is defined as the X direction, and the normal direction of the incoming surface 14a is defined as the Y direction, in relation to a plane parallel to a bottom surface 14b of the light guide plate 14. The normal direction of a light exit surface 14c located on the surface opposite to the bottom surface 14b of the light guide plate 14 is defined as the Z direction.

The imaging unit 10 is not particularly limited, and any member that can capture an image of the space to be viewed may be used. Examples of the imaging unit 10 include a CCD camera.

The image display device 11 displays a two-dimensional image or a three-dimensional image captured by the imaging unit 10 in a display area according to an image signal received from a control device (not shown). The image display device 11 is, for example, a popular liquid crystal display that can output image light by displaying an image in a display area. In the illustrated example, the display area of the image display device 11 and the incoming surface 14a of the light guide plate 14 facing the display area are both arranged to be parallel to the XZ plane. Further, the bottom surface 14b of the light guide plate 14 on which a prism 141 described later is disposed, and the light exit surface 14c facing the bottom surface 14b and emitting light to the mask 15 are both arranged to be parallel to the XY plane. Furthermore, the surface of the mask 15 on which a slit 151 described later is provided is also arranged to be parallel to the XY plane. Note that the display area of the image display device 11 and the incoming surface 14a of the light guide plate 14 may be disposed to face each other, or the display area of the image display device 11 may be disposed to be inclined with respect to the incoming surface 14a.

The image-forming lens 12 is disposed between the image display device 11 and the incoming surface 14a. The image-forming lens 12 converts the image light output from the display area of the image display device 11 into convergent light in the XY plane parallel to the longitudinal direction of the incoming surface 14a, and then, emits the convergent light to the collimating lens 13. Any member may be used for the image-forming lens 12, as long as it can convert the image light into convergent light. For example, the image-forming lens 12 may be a bulk lens, a Fresnel lens, or a diffractive lens. Alternatively, the image-forming lens 12 may be a combination of a plurality of lenses disposed along the Y axis direction.

The collimating lens 13 is disposed between the image display device 11 and the incoming surface 14a. The collimating lens 13 collimates the image light converted into the convergent light by the image-forming lens 12 in the YZ plane orthogonal to the longitudinal direction of the incoming surface 14a. The collimating lens 13 emits the collimated image light to the incoming surface 14a of the light guide plate 14. The collimating lens 13 may be a bulk lens and a Fresnel lens, as with the image-forming lens 12. The arrangement order of the image-forming lens 12 and the collimating lens 13 may be reversed. The functions of the image-forming lens 12 and the collimating lens 13 may be achieved by a single lens, or may be achieved by a combination of multiple lenses. In other words, any combination may be used as the combination of the image-forming lens 12 and the collimating lens 13, as long as it can convert the image light output from the display area of the image display device 11 into convergent light in the XY plane and collimate the convergent light in the YZ plane.

The light guide plate 14 is made of a transparent member, and it receives the image light collimated by the collimating lens 13 at the incoming surface 14a and emits the image light from the light exit surface 14c. In the illustrated example, the light guide plate 14 has a cuboid outer shape having a flat plate shape, and has the incoming surface 14a which is a surface facing the collimating lens 13 and parallel to the XZ plane. A surface parallel to the XY plane and located on the negative side in the Z axis is defined as the bottom surface 14b, and a surface parallel to the XY plane and facing the bottom surface 14b is defined as the light exit surface 14c. The light guide plate 14 is provided with a plurality of prisms (emission structure units) 141.

The plurality of prisms 141 reflects the image light incident on the incoming surface 14a of the light guide plate 14. Each of the prisms 141 is provided on the bottom surface 14b of the light guide plate 14 so as to protrude from the bottom surface 14b toward the light exit surface 14c. The plurality of prisms 141 is substantially triangular grooves which are arranged at regular intervals (for example, 1 mm) in the Y axis direction, when the propagation direction of the image light is along the Y axis direction, for example. Each of the prisms 141 has a predetermined width (for example, 10 μm) in the Y axis direction. Each of the prisms 141 has a reflecting surface (optical surface) 141a which is one of optical surfaces of the prism 141 and which is a surface closer to the incoming surface 14a with respect to the light guide direction (+Y axis direction) of the image light. In the illustrated example, the plurality of prisms 141 is provided on the bottom surface 14b so as to be parallel to the X axis. Thus, the image light which is propagating in the Y axis direction and which is incident on the incoming surface 14a is reflected by the reflecting surfaces 141a of the plurality of prisms 141 provided in parallel with the X axis orthogonal to the Y axis. Each of the plurality of prisms 141 allows the beams of the image light, which are emitted from different positions in the display area of the image display device 11 in the Z axis direction orthogonal to the longitudinal direction of the incoming surface 14a, to emit toward a predetermined viewpoint 100 from the light exit surface 14c which is one surface of the light guide plate 14. The detail of the reflecting surface 141a will be described later.

The mask 15 is made of a material opaque to visible light, and includes a plurality of slits 151. The mask 15 can transmit only light, which is emitted from the light exit surface 14c of the light guide plate 14 and is traveling toward an image formation point 101 on a plane 102, using the plurality of slits 151.

The plurality of slits 151 passes only light which is emitted from the light exit surface 14c of the light guide plate 14 and which is traveling toward the image formation point 101 on the plane 102. In the illustrated example, the plurality of slits 151 is provided in parallel with the X axis. Each of the slits 151 corresponds to any one of the plurality of prisms 141.

Due to the configuration described above, the image display unit 1A forms and projects an image displayed on the image display device 11 on the virtual plane 102 outside of the image display unit 1A. Specifically, first, the image light emitted from the display area of the image display device 11 passes through the image-forming lens 12 and the collimating lens 13, and then enters the incoming surface 14a which is an end surface of the light guide plate 14. Next, the image light incident on the light guide plate 14 propagates through the light guide plate 14 and reaches the prism 141 provided on the bottom surface 14b of the light guide plate 14. The image light having reached the prism 141 is reflected in the positive direction of the Z axis by the reflecting surface 141a of the prism 141, and is emitted from the light exit surface 14c of the light guide plate 14 positioned parallel to the XY plane. Then, the image light emitted from the light exit surface 14c and passing through the slit 151 of the mask 15 forms an image on the image formation point 101 in the plane 102. That is, the image light emitted from an individual point in the display area of the image display device 11 can be converted into convergent light in the XY plane, collimated in the YZ plane, and then projected onto the image formation point 101 in the plane 102. The image display unit 1A can project the image output in the display area of the image display device 11 on the plane 102 by performing the abovementioned process on all points in the display area. Thus, a user can visually recognize the image projected in the air when viewing the virtual plane 102 from the viewpoint 100. Although the plane 102 is a virtual plane on which the projected image is formed, a screen or the like may be disposed to improve the visibility.

In a case where the collimating lens 13 is disposed such that the center of the incoming surface 14a coincides with the optical axis of the collimating lens 13 in the Z axis direction, the following problem may arise on the image projected on the plane 102. That is, light beams, which are respectively emitted from two points equidistant from the optical axis in the Z axis direction in the XZ plane orthogonal to the optical axis of the collimating lens 13 and which enter the light guide plate 14 through the incoming surface 14a, have the same angle with respect to the bottom surface 14b. Therefore, the light beams from these two points are reflected by the same prism 141 and travels toward the plane 102. This arises a problem that the two points seem to overlap with each other from the viewpoint 100.

In view of this, the image display device 11 is preferably disposed such that the entire display area is positioned farther on the positive side or the negative side of the Z axis than the light guide plate 14. In the present embodiment, the entire display area of the image display device 11 is positioned farther on the negative side than the light guide plate 14. In this case, a mirror 20 may be disposed at a position indicated by a dotted line in FIG. 2 in order to increase the amount of light entering the light guide plate 14 from the image display device 11 via the collimating lens 13. It is preferable that the mirror 20 is disposed on the side opposite to the image display device 11 across the optical axis of the collimating lens 13 in the Z axis direction, and has a reflecting surface parallel to the light exit surface 14c and oriented to the image display device 11.

Further, as shown in FIG. 2, the image light emitted from a point located farther on the negative side of the Z axis in the display area of the image display device 11 is incident on the prism 141 located closer to the image display device 11, as compared to the image light emitted from a point located farther on the positive side of the Z axis. It can be seen that the incident light is then reflected by the prism 141 and passes through the slit 151 corresponding to the prism 141.

Figure 3:
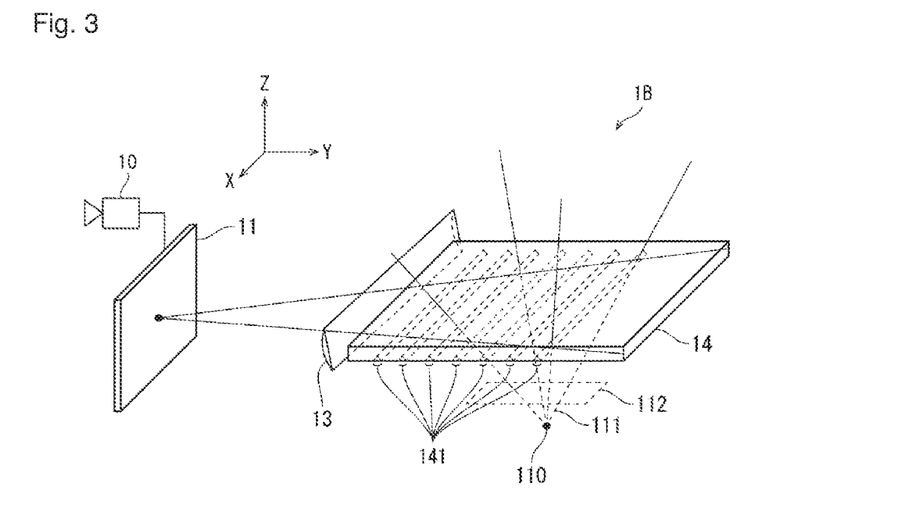
FIG. 3 is a view showing a schematic configuration of a modification of the image display unit shown in FIGS. 1 and 2.

FIG. 3 is a view showing a schematic configuration of a modification of the image display unit 1A shown in FIGS. 1 and 2. Note that FIG. 3 shows a schematic configuration and shows only the configuration of the imaging unit 10, the image display device 11, the collimating lens 13, and the light guide plate 14.

As shown in FIG. 3, an image display unit 1B is different from the image display unit 1A in that a virtual image is formed on a plane 112 located on the side opposite to the viewer with respect to the light exit surface 14c of the light guide plate 14 by the light reflected by the prism 141.

As shown in FIG. 3, the image display unit 1B does not have the image-forming lens 12 shown in FIGS. 1 and 2. Therefore, the image light output from the display area of the image display device 11 is diffused without being converged on the XY plane parallel to the longitudinal direction of the incoming surface 14a and is incident on the incoming surface 14a of the light guide plate 14. The image light thus diffused on the XY plane propagates through the light guide plate 14, is reflected by the prism 141, and is emitted from a light exit surface 14c. At this time, each of the plurality of prisms 141 allows the beams of the image light, which are emitted from different positions in the display area of the image display device 11 in the Z axis direction orthogonal to the longitudinal direction of the incoming surface 14a, to emit toward a predetermined viewpoint 100 from the light exit surface 14c which is one surface of the light guide plate 14.

At this time, since the image light propagating through the light guide plate 14 is the light which has been diffused in the XY plane, the light reflected by the plurality of prisms 141 is diffused, without being converged, toward the viewpoint 100. Therefore, light reflected by the plurality of prisms 141 is emitted from the light exit surface 14c, as if it is emitted from the image formation point 111 of the plane 112 on the side opposite to the viewer with respect to the light exit surface 14c of the light guide plate 14. That is, a virtual image is formed on the plane 112 by the light reflected by the plurality of prisms 141. Thus, the viewer can visually recognize a stereoscopic image in a space on the side opposite to the viewer with respect to the light guide plate 14.

The configuration shown in FIG. 3 allows the image light diffused in the XY plane to enter the light guide plate 14 without providing the image-forming lens 12. However, the image display unit 1B is not limited to have the configuration shown in FIG. 3 as long as it can allow the image light diffused in the XY plane to enter the light guide plate 14. For example, a concave lens may be provided between the image display device 11 and the light guide plate 14 for diffusing and emitting the image light in the XY plane.

Further, in the image display unit 1A shown in FIGS. 1 and 2, the plane 102 on which an image is to be formed can be adjusted according to the focal length of the image-forming lens 12. Therefore, in the configurations shown in FIGS. 1 and 2 provided with the image-forming lens 12, it is also possible to form a virtual image on the plane 112 located on the side opposite to the viewer by appropriately setting the focal length.

Figure 4:
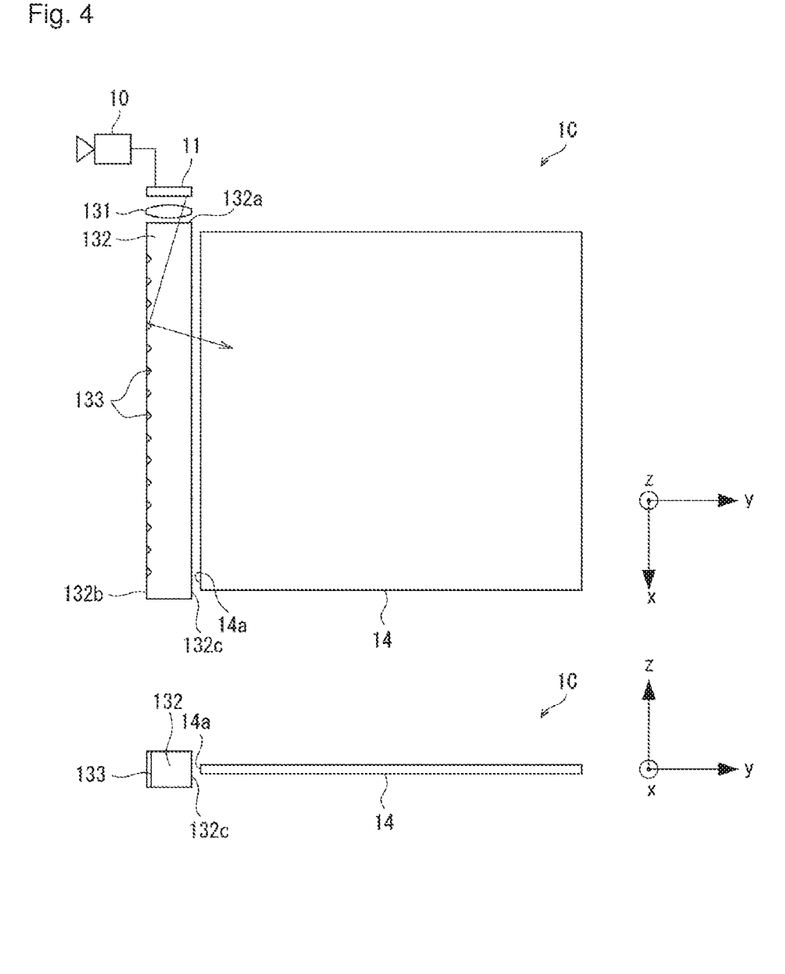
FIG. 4 is a view showing a schematic configuration of still another modification of the image display unit shown in FIGS. 1 and 2.

FIG. 4 is a view showing a schematic configuration of still another modification of the image display unit 1A shown in FIGS. 1 and 2. An image display unit 1C according to the modification is configured such that, in place of the collimating lens 13, a light guide member for guiding image light from the image display device 11 to the light guide plate 14 is used in the image display unit 1A shown in FIGS. 1 and 2.

In the image display unit 1C, the image light emitted from the image display device 11 reaches the incoming surface 14a of the light guide plate 14 via a collimating lens 131 and a light guide member 132, and the collimating lens 131 and the light guide member 132 are arranged such that the light is converted into parallel light having an angle according to the position of the image display device 11 in the YZ plane and is also converted into parallel light in the XY plane. The collimating lens 131 and the light guide member 132 are another example of a collimating member. Further, the collimating lens 131 and the light guide member 132 constitute an image forming unit together with the light guide plate 14.

Specifically, the light guide member 132 is a transparent member formed into a cuboid shape, and has one surface along a short direction defined as an incoming surface 132*a*. In addition, one surface along the longitudinal direction of the light guide member 132 is defined as an outgoing surface 132*c* for emitting light incident on the incoming surface 132*a*, and a surface facing the outgoing surface 132*c* is defined as a diffusion surface 132*b*. The light guide member 132 is preferably formed such that the length of the light guide member 132 in the longitudinal direction is substantially equal to the length of the incoming surface 14*a* in the longitudinal direction, and the thickness of the light guide member 132 in the YZ plane is greater than the thickness of the light guide plate 14 in the YZ plane. Thus, the light guide member 132 can guide the light from the image display device 11 to the light guide plate 14 while maintaining the angle of the light according to the position on the display surface of the image display device 11 in the Z direction.

Further, the light guide member 132 is disposed such that the outgoing surface 132*c* of the light guide member 132 faces the incoming surface 14*a* of the light guide plate 14. Further, the image display device 11 is disposed so as to face the incoming surface 132*a* of the light guide member 132 via the collimating lens 131 and to be located at the front focal point of the collimating lens 131. That is, in this example, the image display device 11 is disposed such that the display surface of the image display device 11 is parallel to the direction orthogonal to the incoming surface 14*a* of the light guide plate 14. Therefore, in this modification, the image display device can be reduced in size, and the display device is also entirely reduced in size. In this modification, the incoming surface may be formed to have, for example, a tapered shape so that the angle formed by the incoming surface and the outgoing surface of the light guide member is other than the orthogonal angle. Further, the light guide member 132 and the light guide plate 14 may be integrally formed.

The light emitted from the image display device 11 is collimated by the collimating lens 131 regardless of the direction, and enters the light guide member 132 from the incoming surface 132*a* of the light guide member 132. That is, the light emitted from the image display device 11 is converted into collimated light traveling in the direction according to the display position on the image display device 11. Then, the collimated light propagates while being totally reflected in the light guide member 132, and is reflected toward the outgoing surface 132*c* by a plurality of prisms 133 (light path conversion units) provided on the diffusion surface 132*b* of the light guide member 132.

The respective prisms 133 are arranged in a lattice at a predetermined pitch (for example, 1 mm) in the X direction, that is, the longitudinal direction of the incoming surface 14*a* of the light guide plate 14. Each prism 133 is extended, for example, along the Z direction, and is formed as a substantially triangular groove having a predetermined width (for example, 10 μm) in the X direction. Each prism 133 has a reflecting surface having an angle β with respect to the diffusion surface 132*b* and oriented to face the incoming surface 132*a*. Note that the predetermined angle β is set such that the light from the image display device 11 incident on the light guide member 132 is totally reflected and directed to the outgoing surface 132*c*, for example, set to be 37 to 45° with respect to the diffusion surface 132*b*. Further, the prisms 133 more distant from the incoming surface 132*a* in the prisms 133 have a larger angle β so that light traveling in the same direction in the XY plane is condensed at one point on a predetermined image forming surface. Thus, the light emitted from the light guide member 132 is collimated in relation to the short direction (that is, the thickness direction) of the incoming surface 14*a* of the light guide plate 14, and converged in relation to the longitudinal direction of the incoming surface 14*a*, as in the image display unit 1A. Therefore, the image display unit 1C can project the image displayed on the image display device 11 into a space, as in the image display unit 1A.

The collimating lens 131 and the light guide member 132 are each formed by molding a material transparent to visible light, for example, a resin such as polymethyl methacrylate (PMMA), polycarbonate, or cycloolefin polymer.

A cylindrical lens having a positive power in the longitudinal direction of the incoming surface 14*a* may be disposed between the outgoing surface 132*c* of the light guide member 132 and the incoming surface 14*a* of the light guide plate 14. In this case, since the light from the image display device 11 is converged by the cylindrical lens in the longitudinal direction of the incoming surface 14*a*, the angles of the reflecting surfaces of the prisms 133 of the light guide member 132 may be the same.

It can be said that the image display units 1A to 10 described above are configured to include the image display device 11, a collimator that collimates the image light from the image display device 11, and the light guide plate 14. For example, in the image display unit 1A, the collimator corresponds to the image-forming lens 12 and the collimating lens 13. In the image display units 1A to 10, the image display device 11 and the collimator are separately provided. However, the image display unit according to the present embodiment is not limited to such a configuration, and it is only sufficient that the image light from the image display device 11 is incident on the incoming surface 14*a* of the light guide plate 14 as collimated light. For example, the image display unit may have a configuration in which the image display device 11 and the collimator are integrated, that is, a configuration in which the image display device 11 itself emits collimated image light.

As described above, the image display units 1A to 10 according to the embodiment are configured to include the imaging unit 10 that captures an image of a space to be viewed, the image display device 11 (image display), and an image forming unit that forms an image displayed by the image display device 11 in a space. The image forming unit includes the image-forming lens 12, the collimating lens 13, the light guide plate 14, and the mask 15.

In the prior art, an image is displayed on a fixed display screen, and therefore, the distance between a viewer and the display image is fixed. Therefore, it may be hard for the viewer to view the display image depending on the positional relationship between the viewer and the display screen.

On the other hand, in the image display units 1A to 10 according to the embodiment, a real-time image of the space to be viewed captured by the imaging unit 10 is displayed by the image display device 11, and the displayed image is formed in a space where there is no screen by the image forming unit. That is, in the embodiment, the real-time image is not displayed on a positionally fixed display screen but formed in a space by the image forming unit in order to allow the viewer to confirm the real-time image. The real-time image formed in a space by the image forming unit and the positional relationship with the viewer (for example, whether the image is formed near the viewer or away from the viewer) can be set by designing the components (for example, the configuration of the prisms 141 of the light guide plate 14) of the image forming unit. Therefore, the embodiment can achieve an image display unit having excellent degree of freedom in designing the position of a display image with respect to the viewer, and provides an effect of displaying (forming) the real-time image at a position optimum for the viewer.

The image display units 1A to 10 according to the embodiment may be configured such that the imaging unit 10 captures an image of a blind spot space hidden by an obstruction in the viewing direction of the viewer, and the image of the blind spot space is formed in a space by the image forming unit. In such a configuration, the image forming unit (more specifically, the light guide plate 14) is provided at a position in the obstruction where the gaze to the blind spot space in the viewing direction passes. With such a configuration, when directing his/her gaze to the blind spot space hidden by the obstruction, the viewer views the blind spot space in the direction of the gaze. Accordingly, the viewer can view the blind spot space without having any discomfort.

The use application of the image display units 1A to 10 according to the embodiment is not particularly limited. However, they are preferably used for vehicles, in particular. Specifically, the image display units 1A to 10 according to the embodiment are preferably used in such a way that a driver or a passenger inside a vehicle checks the environment outside the vehicle and the environment (engine and tire) inside the vehicle in his/her seat, while the vehicle is traveling or stopped.

In addition, it is preferable that the image forming unit forms the image in a space opposite to the viewer with respect to the light guide plate 14 of the image forming unit. In this case, the image forming unit forms a real-time image in the space opposite to the viewer with respect to the light guide plate 14. The viewer recognizes the real-time image formed by the image forming unit not as an image closer to the viewer but as an image farther away from the viewer. For example, when a conventional image display unit (for example, the device disclosed in Patent Document 1) is installed so that a space outside the vehicle is checked, the imaging unit is installed outside the vehicle, and the image display device for displaying an image captured by the imaging unit is installed inside the vehicle. Due to the difference between the installation position of the imaging unit and the installation position of the image display device, the real-time image displayed by the image display device is positioned closer to the viewer than the view of the environment outside the vehicle actually viewed through a window or the like, as viewed by the viewer. For this reason, there is a deviation in focal point between the real-time image displayed by the image display device and the view actually viewed through the window, by which the viewer has discomfort with the real-time image.

On the other hand, according to the embodiment, the viewer recognizes the real-time image formed by the image forming unit not as an image closer to the viewer but as an image (depth image) farther away from the viewer. Therefore, the deviation in focal point between the real-time image displayed by the image display device 11 and the view actually viewed through the window is reduced, whereby the discomfort with the real-time image can be reduced.

Further, the display device disclosed in Patent Document 2, for example, is configured such that an image captured by the imaging unit is projected onto the holographic optical element by the projector unit, and the holographic optical element diffracts the image projected by the projector unit toward a viewer. In this configuration, the light of the image projected by the projector unit is diffracted toward the viewer by the holographic optical element. Therefore, only the viewer can view the image projected by the projector unit. A person other than the viewer (for example, a passenger other than the driver) cannot view the image projected by the projector unit. On the other hand, according to the embodiment, the image displayed by the image display device 11 is formed in a space by the image forming unit, whereby passengers as well as the viewer can view the real-time image.

A head-up display is conventionally known as an image display unit for checking the space outside the vehicle from the inside of the vehicle. The head-up display is basically configured to project an image captured by an imaging unit by a projector and to reflect the projection light by a reflection mirror. Therefore, when being configured to project an image in a direction away from a viewer, the head-up display may be increased in size, due to settings such as a projection distance by the projector and an optical distance required for reflection by the reflection mirror. In addition, it is difficult to project an image in a direction away from the viewer.

On the other hand, the embodiment can be configured to project an image in a direction away from the viewer by designing the components of the image forming unit (for example, the configuration of the prism 141 of the light guide plate 14). Therefore, it is possible to achieve a lightweight and compact image display unit.

(Example of Application of Image Display Unit According to the Embodiment)

Figure 5:
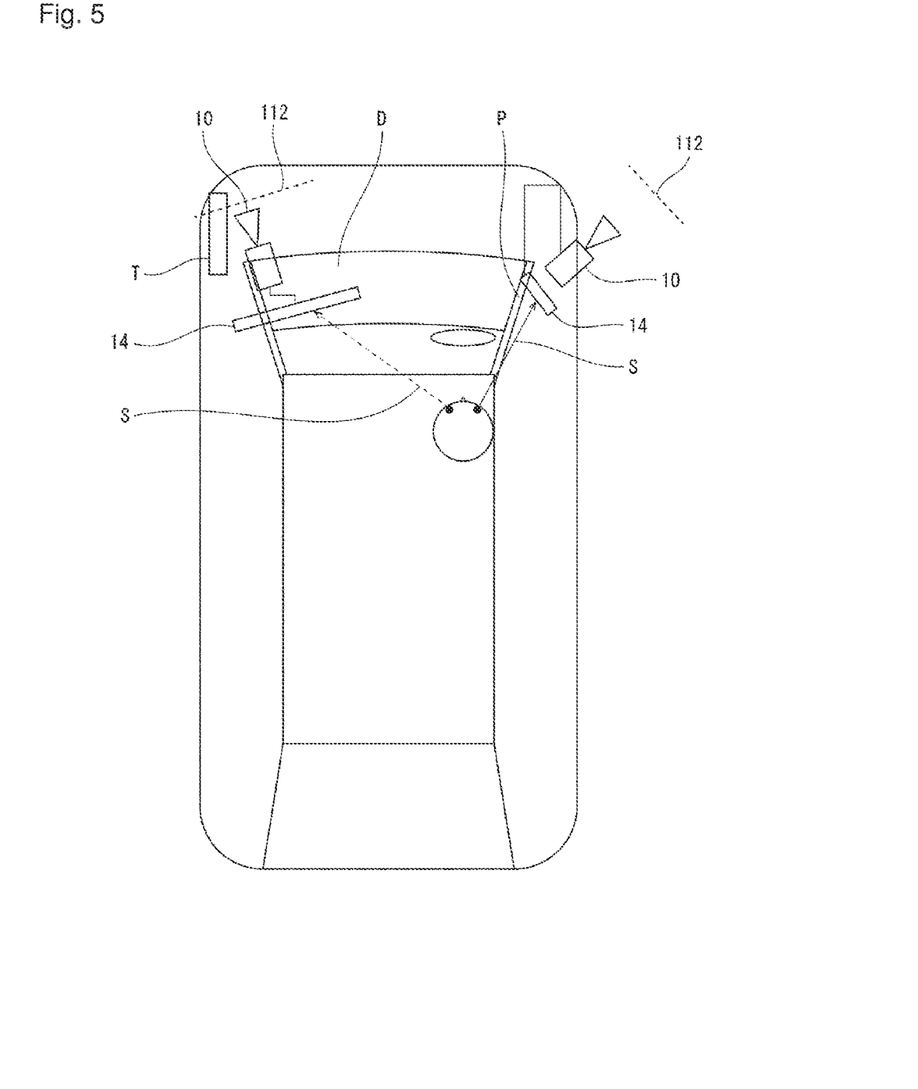
FIG. 5 is a schematic view showing an application example of the image display unit according to the embodiment of the present invention for allowing a driver inside a vehicle to view a blind spot space hidden by an obstruction inside the vehicle.
Figure 6:
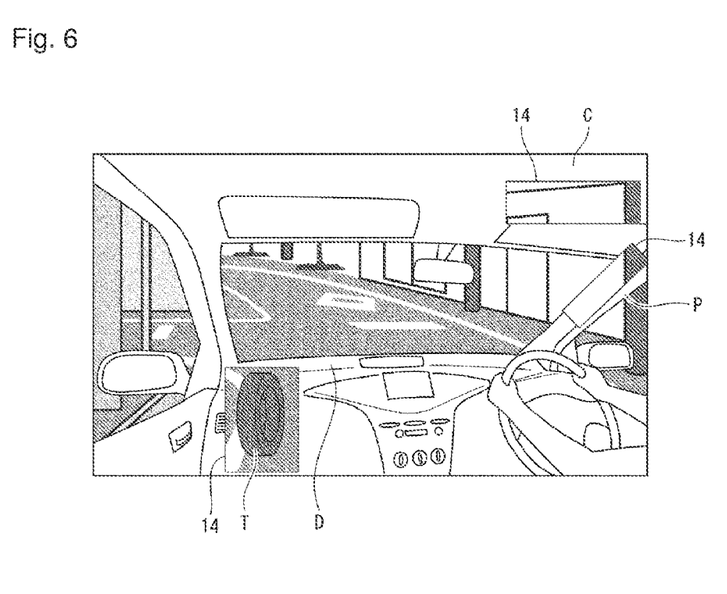
FIG. 6 is a view schematically showing a state in which the image display unit according to the embodiment of the present invention is disposed in a pillar inside the vehicle on the front side, a dashboard, and a ceiling.

Hereinafter, an application example in which the image display units 1A to 1C according to the embodiment are applied to a vehicle will be described. FIG. 5 is a schematic view showing an application example of the image display unit for allowing a driver inside a vehicle to view a blind spot space hidden by an obstruction inside the vehicle. FIG. 6 is a view schematically showing a state in which the image display unit according to the embodiment is disposed in a pillar P inside the vehicle on the front side, a dashboard D, and a ceiling C.

As shown in FIG. 5, the imaging unit 10 may be configured to capture an image of a blind spot space hidden by the pillar P in the vehicle. In this case, the light guide plate 14 of the image forming unit is provided at a position in the pillar P where a gaze S of the driver to the blind spot space in the viewing direction passes. In this case, when directing his/her gaze S to the blind spot space hidden by the pillar P, the driver views the blind spot space in the direction of the gaze S. Therefore, the driver can check the blind spot space hidden by the pillar P without having any discomfort, as shown in FIG. 6. Further, in this configuration, an image of the blind spot space is formed by the image forming unit on the plane 112 located in a space distant from the driver. Therefore, the deviation between the real-time image captured by the imaging unit 10 and formed by the light guide plate 14 and the view actually viewed through the window is reduced, whereby the discomfort of the driver with the real-time image can be reduced.

Further, as shown in FIG. 5, the imaging unit 10 may be configured to capture an image of a blind spot space hidden by the dashboard D in the vehicle. In this case, the light guide plate 14 of the image forming unit is provided at a position in the dashboard D where the gaze S of the driver to the blind spot space in the viewing direction passes. In this case, when directing his/her gaze S to the blind spot space hidden by the dashboard D, the driver views the blind spot space in the direction of the gaze S. In this case, a tire T of the vehicle is present in the blind spot space. Therefore, as shown in FIG. 6, the driver can check the condition of the tire T originally hidden by the dashboard D inside the vehicle while the vehicle is traveling or stopped. Further, in this configuration, an image of the blind spot space is formed by the image forming unit on the plane 112 located in a space distant from the driver. The plane 112 is at substantially the same position as the tire T. Therefore, the driver can check the tire T in the blind spot space hidden by the dashboard D without having any discomfort.

Further, although not illustrated in FIG. 5, the imaging unit 10 may be configured to capture an image of a blind spot space hidden by the ceiling of the vehicle. In this case, the light guide plate 14 of the image forming unit is provided at a position in the ceiling where a gaze of the driver or a passenger to the blind spot space in the viewing direction passes. Therefore, the driver can check the blind spot space hidden by the ceiling C without having any discomfort, as shown in FIG. 6. Thus, an object (for example, a traffic light) in the blind spot space hidden by the ceiling C can be projected, via the light guide plate 14, onto a plane having a distance according to the distance between the vehicle body and the object, as if the object can be seen through the vehicle body. Therefore, the viewer can view the object without focusing. In addition, the viewer can view the object hidden by the ceiling C with the movement of the vehicle.

In addition, the imaging unit 10 may be configured to capture an image of a blind spot space hidden by the door of the vehicle. In this case, the light guide plate 14 of the image forming unit is provided at a position in the door where a gaze of the driver or a passenger to the blind spot space in the viewing direction passes.

Figure 7:
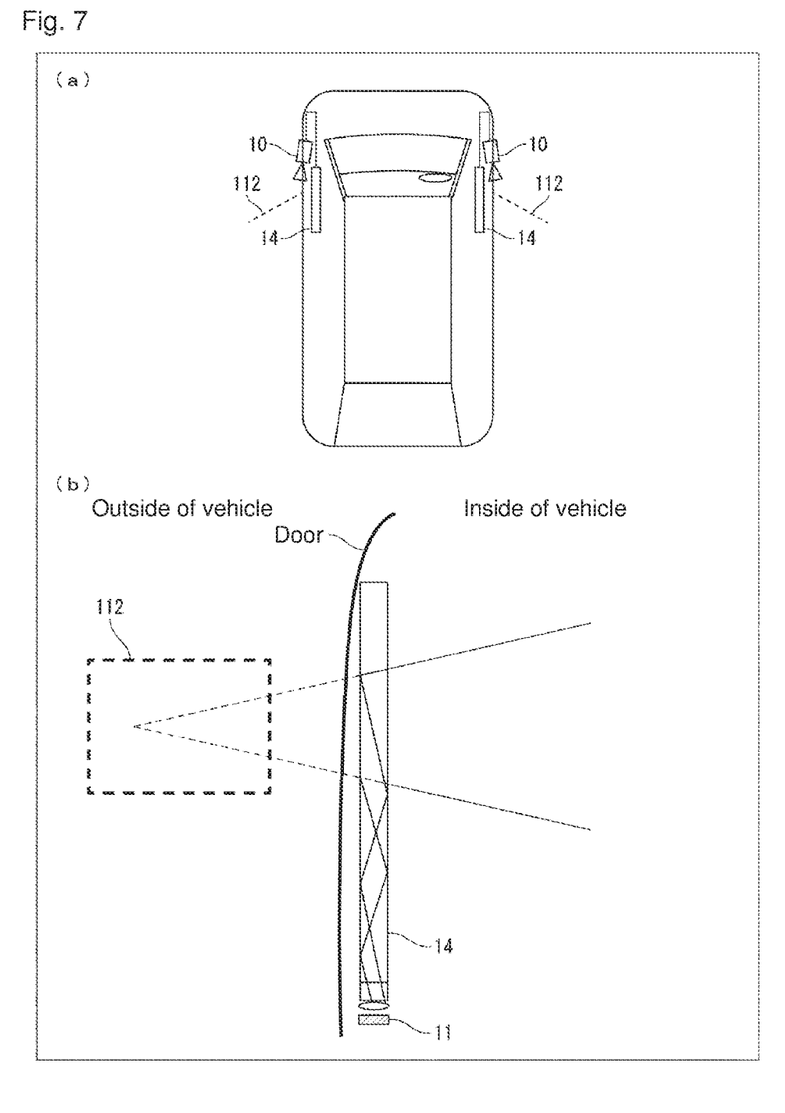
FIGS. 7(a) and 7(b) show an example of a configuration in which the imaging unit captures an image of a space on the side of the vehicle, FIG. 7(a) showing the position of the image forming unit, and FIG. 7(b) showing a schematic configuration of an area near a light guide plate in FIG. 7(a).

FIGS. 7(a) and 7(b) show an example of a configuration in which the imaging unit 10 captures an image of a space on the side of the vehicle. FIG. 7(a) shows the position of the image forming unit, and FIG. 7(b) shows a schematic configuration of an area near the light guide plate in FIG. 7(a).

As shown in FIGS. 7(a) and 7(b), the imaging unit 10 may be configured to capture an image of a space on the side of the vehicle. In this case, the imaging unit 10 captures an image of a space on the side rear of the vehicle. For example, the imaging unit 10 captures an image of a space substantially same as the space in an ordinary side mirror of the vehicle. In this case, the light guide plate 14 of the image forming unit is provided in the window of the door of the vehicle. The image display device 11 is disposed to face the side surface of the light guide plate 14. The side surface of the light guide plate 14 facing the image display device 11 serves as an incoming surface on which image light is incident.

In the configuration shown in FIGS. 7(a) and 7(b), an image of the space on the side rear of the vehicle is formed by the image forming unit on the plane 112 positioned in a space distant from the driver. Furthermore, the plane 112 on which the real-time image is formed is inclined with respect to the light guide plate 14. The driver views the space on the side rear of the vehicle captured by the imaging unit 10 through the window of the door without having any discomfort, while facing forward. In addition, it is possible to form a real-time image on the plane 112 inclined with respect to the light guide plate 14 by designing the components (for example, the configuration of the prism 141 of the light guide plate 14) of the image forming unit.

Further, it is also possible to design the image formation point of the real-time image by adjusting the position of the image display device 11 with respect to the light guide plate 14.

For example, in the image display unit 1A, the image-forming lens 12 may be eliminated in order to display a virtual image, which seems to be positioned behind the light guide plate 14, of the image displayed in the display area of the image display device 11. In this case, the image display device 11 may be disposed at a position away from the incoming surface 14a of the light guide plate 14 by a predetermined distance. The distance between the incoming surface 14a and the image display device 11 corresponds to a value obtained by subtracting, from the distance between the virtual image and the light guide plate 14, a value obtained by dividing the distance between the position where light is emitted in the light guide plate 14 and the incoming surface 14a of the light guide plate 14 by the product of the refractive index of the light guide plate 14 and a cosine of an angle between the light propagating through the light guide plate 14 and the light exit surface 14c. When the slits 151 are used as in the configuration shown in FIGS. 1 and 2, the positions of the slits 151 in the direction orthogonal to the incoming surface 14a can be determined according to the position of the virtual image to be displayed. When the angle of the reflecting surface of each prism 141 is set according to the position of the image to be formed, the angle of the reflecting surface of each prism 141 may be set according to the position of the virtual image to be displayed. That is, the angle of the reflecting surface of the prism 141 is smaller with distance from the incoming surface 14a.

According to the configuration shown in FIGS. 7(a) and 7(b), the driver of the vehicle can visually recognize a space on the side (especially, on the side rear) of the vehicle without having any discomfort.

In the configuration shown in FIGS. 7(a) and 7(b), the light guide plate 14 of the image forming unit is provided in the window of the door of the vehicle. However, when the imaging unit 10 is configured to capture an image of the space on the side of the vehicle, the light guide plate 14 is not limited to be provided in the window of the door of the vehicle. It is only sufficient that the light guide plate 14 is provided in an area where the driver or the passenger can visually recognize the space on the side of the vehicle. For example, the light guide plate 14 may be disposed on the dashboard.

FIGS. 8(a) and 8(b) illustrate an example of a configuration in which the imaging unit 10 captures an image of a space behind the vehicle. FIG. 8(a) is a view showing a state in which the image forming unit does not form a real-time image via the light guide plate 14, and FIG. 8(b) is a view showing a state in which the image forming unit forms a real-time image via the light guide plate 14. FIG. 9 is a diagram schematically showing a configuration of a main part of an image display unit provided in the configuration shown in FIGS. 8(a) and 8(b).

As shown in FIGS. 8(a) and 8(b), the imaging unit 10 may be configured to capture an image of a space behind the vehicle. For example, the imaging unit 10 captures an image of a space substantially the same as the space viewed by the driver when the driver driving a normal vehicle looks behind to back the vehicle. In this case, the light guide plate 14 of the image forming unit is provided behind a driver's seat 2 in the vehicle and at a position between the driver's seat 2 and a passenger's seat 3. For example, as shown in FIG. 9, when an obstruction 4 is provided behind the driver's seat 2, the light guide plate 14 is provided on the surface of the obstruction 4 facing the driver's seat 2 and the passenger's seat 3, and positioned between the driver's seat 2 and the passenger's seat 3 as viewed from front.

Figure 8:
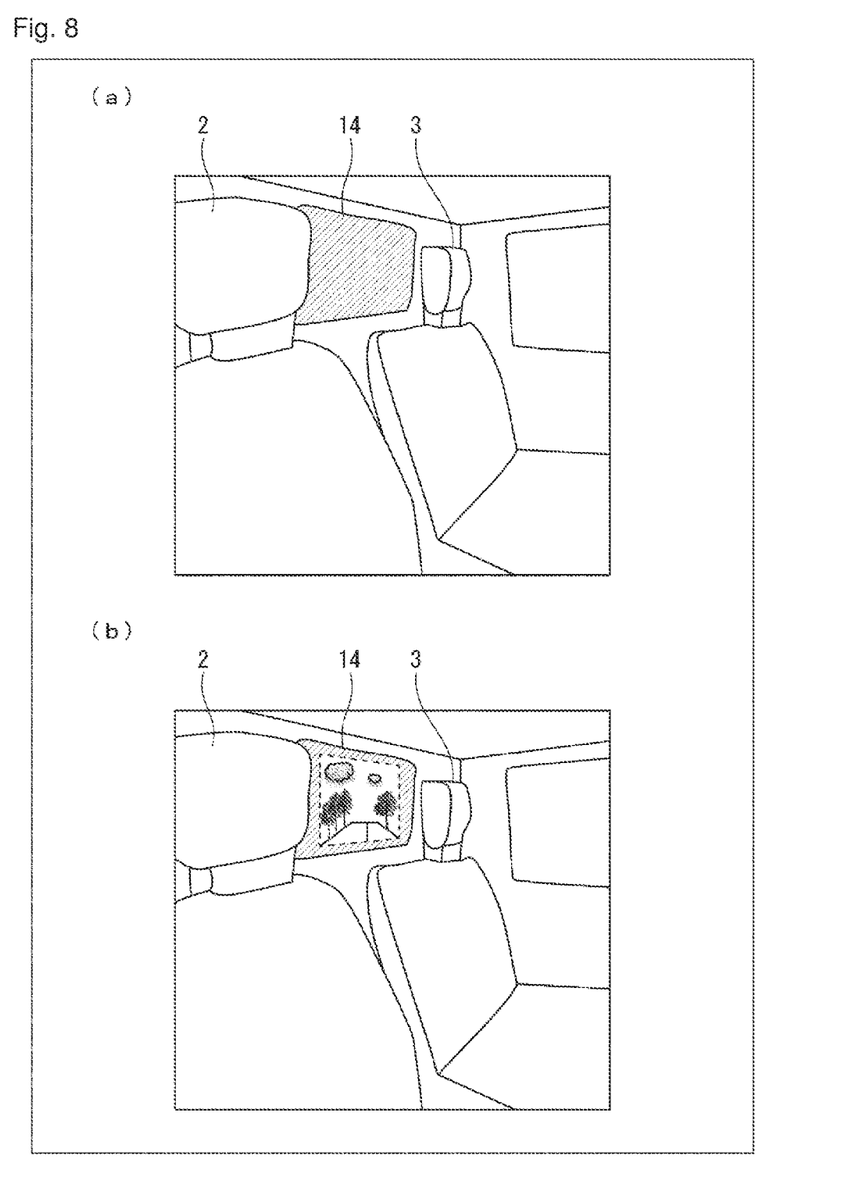
FIGS. 8(a) and 8(b) show an example of a configuration in which the imaging unit captures an image of a space behind the vehicle, FIG. 8(a) showing a state in which the image forming unit does not form a real-time image via the light guide plate, and FIG. 8(b) showing a state in which the image forming unit forms a real-time image via the light guide plate.
Figure 9:
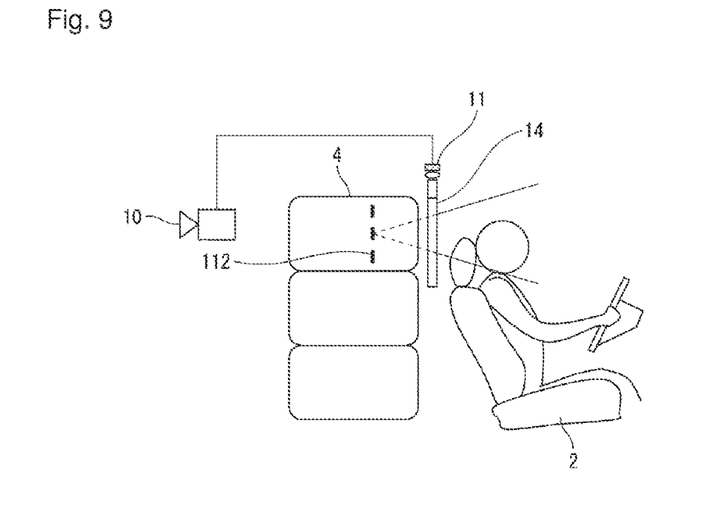
FIG. 9 is a diagram schematically showing a configuration of a main part of an image display unit provided in the configuration shown in FIGS. 8(a) and 8(b).

In the state shown in FIG. 8(*a*) where the image forming unit does not form a real-time image via the light guide plate 14, the light guide plate 14 is a translucent member that transmits visible light. Therefore, the driver views the obstruction 4 via the light guide plate 14 when looking behind in the driver's seat 2. On the other hand, in the state shown in FIG. 8(*b*) where the image forming unit forms a real-time image via the light guide plate 14, the driver views the real-time image of the space behind the vehicle formed on the light guide plate 14 when looking behind in the driver's seat 2. As described above, according to the configurations shown in FIGS. 8(*a*) and 8(*b*), even if the driver cannot view the space behind the vehicle body due to the obstruction when the driver looks behind, the driver can view the space behind the vehicle body via the light guide plate 14 of the image display unit.

As shown in FIG. 9, in the image display unit provided in the configuration shown in FIGS. 8(*a*) and 8(*b*), the image captured by the imaging unit 10 is displayed on the display surface by the image display device 11. Then, the image forming unit forms the image displayed by the image display device 11 in a space via the light guide plate 14. At this time, the real-time image of the area behind the vehicle body captured by the imaging unit 10 is formed on the plane 112 positioned in a space distant from the driver. Therefore, discomfort of the driver with the real-time image can be reduced.

Note that the installation position of the light guide plate 14 is not limited to the position shown in FIGS. 8(*a*) and 8(*b*). The light guide plate 14 may be installed at any position as long as the driver can view an image to be formed without having any discomfort. For example, the light guide plate 14 may be provided in front of the driver (for example, at the position where a rearview mirror is installed). That is, the light guide plate 14 of the image forming unit may be provided in front of the driver's seat of the vehicle and at a position between the driver's seat and the passenger's seat. In this configuration, the image display unit according to the embodiment is used as a rearview mirror. According to this configuration, a real-time image is formed in a space farther away from the driver, as compared to the configuration (for example, configuration disclosed in Patent Document 3) in which a display device for displaying a real-time image of an area behind a vehicle is mounted at a position inside the vehicle where a rearview mirror is installed. Thus, the driver can view the formed image at an appropriate distance.

The present invention is not limited to the above-described embodiments, and various modifications can be made within the scope of the claims, and embodiments obtained by appropriately combining the technical means described in different embodiments are also included in the technical scope of the present invention.

SUMMARY

The image display unit according to the embodiment of the present invention includes an imaging unit configured to capture an image of a space to be viewed, an image display configured to display an image captured by the imaging unit in a display area in real time, and an image forming unit configured to form an image in a space where there is no screen by projecting the image displayed by the image display.

According to the above configuration, a real-time image of the space to be viewed captured by the imaging unit is displayed by the image display, and the displayed image is formed in a space where there is no screen by the image forming unit. That is, according to the above configuration, the real-time image is not displayed on a positionally fixed display screen but formed in a space by the image forming unit in order to allow the viewer to confirm the real-time image. The positional relationship between the real-time image formed in a space by the image forming unit and the viewer can be set by designing components of the image forming unit. Therefore, according to the above configuration, it is possible to achieve an image display unit having excellent degree of freedom in designing the position of a display image with respect to the viewer.

The image display unit according to the embodiment of the present invention may be configured such that the imaging unit captures an image of at least a part of a blind spot space hidden by an obstruction in a viewing direction of the viewer, and the image forming unit is provided at a position in the obstruction where a gaze to the blind spot space in the viewing direction passes.

According to the above configuration, the image forming unit is provided at a position in the obstruction where the gaze to the blind spot space in the viewing direction passes. Thus, when directing his/her gaze to the blind spot space hidden by the obstruction, the viewer views the blind spot space in the direction of the gaze. Accordingly, the viewer can view the blind spot space without having any discomfort.

It is preferable that, in the image display unit according to the embodiment of the present invention, the image forming unit forms the image in a space opposite to the viewer with respect to the image forming unit.

According to the above configuration, the image forming unit forms a real-time image in the space opposite to the viewer. Therefore, the viewer recognizes the real-time image formed by the image forming unit not as an image closer to the viewer but as an image farther away from the viewer. Therefore, according to the above configuration, the deviation in focal point between the real-time image displayed by the image display and an actual blind spot space is reduced, whereby the discomfort of the viewer with the real-time image can be reduced.

The image display unit according to the embodiment of the present invention is preferably used for vehicles.

The image display unit according to the embodiment of the present invention may be configured such that the imaging unit captures an image of a blind spot space hidden by a ceiling of the vehicle, and the image forming unit is provided at a position in the ceiling where a gaze to the blind spot space in the viewing direction passes.

According to the above configuration, an object in the blind spot space hidden by the ceiling can be projected, via the image forming unit, onto a plane having a distance according to an actual distance between a vehicle body and the object, as if the object can be seen through the vehicle body. Therefore, the viewer can view the object without focusing. In addition, the viewer can view the object hidden by the ceiling with the movement of the vehicle.

The image display unit according to the embodiment of the present invention may be configured such that the imaging unit captures an image of a blind spot space hidden by a pillar inside the vehicle, and the image forming unit is provided at a position in the pillar where a gaze to the blind spot space in the viewing direction of the viewer passes.

According to the above configuration, the driver of the vehicle can view the blind spot space hidden by the pillar without having any discomfort.

The image display unit according to the embodiment of the present invention may be configured such that the imaging unit captures an image of a blind spot space hidden by a dashboard inside the vehicle, and the image forming unit is provided at a position in the dashboard where a gaze to the blind spot space in the viewing direction of the viewer passes.

According to the above configuration, the driver of the vehicle can view the blind spot space hidden by the dashboard without having any discomfort.

The image display unit according to the embodiment of the present invention may be configured such that the imaging unit captures an image of a blind spot space hidden by a door of the vehicle, and the image forming unit is provided at a position in the door where a gaze to the blind spot space in the viewing direction of the viewer passes.

According to the above configuration, the driver of the vehicle can view the blind spot space hidden by the door without having any discomfort.

The image display unit according to the embodiment of the present invention may be configured such that the imaging unit captures an image of a space on the side of the vehicle, and the image forming unit is provided in a window of the door of the vehicle.

According to the above configuration, the driver of the vehicle can visually recognize a space on the side (especially, on the side rear) of the vehicle without having any discomfort.

The image display unit according to the embodiment of the present invention may be configured such that the imaging unit captures an image of a space behind the vehicle, and the image forming unit is provided at a position behind a driver's seat in the vehicle and between the driver's seat and a passenger's seat.

When looking behind, the driver can view the space behind the vehicle without having any discomfort. In addition, even when the space behind the vehicle body cannot be viewed due to an obstruction, the driver can view the space behind the vehicle body via the image forming unit.

The image display unit according to the embodiment of the present invention may be configured such that the imaging unit captures an image of a space behind the vehicle, and the image forming unit is provided at a position in front of a driver's seat in the vehicle and between the driver's seat and a passenger's seat.

In the above configuration, the image display unit is used as a rearview mirror. According to the above configuration, a real-time image is formed in a space farther away from the driver, as compared to the configuration (for example, configuration disclosed in Patent Document 3) in which a display device for displaying a real-time image of an area behind a vehicle is mounted at a position inside the vehicle where a rearview mirror is installed. Thus, the driver can view the formed image at an appropriate distance.

The image display unit according to the embodiment of the present invention is preferably configured such that the image forming unit includes a light guide plate having: an incoming surface on which image light from the image display is incident; and a plurality of emission structure units configured to allow the image light incident on the incoming surface to be emitted to an outgoing surface by reflecting or refracting the image light, the light guide plate receiving the image light collimated in a direction orthogonal to a longitudinal direction of the incoming surface, and each of the plurality of emission structure units allows light beams emitted from different positions in the display area in the direction orthogonal to the longitudinal direction of the incoming surface to be emitted toward a predetermined viewpoint from a light exit surface which is one surface of the light guide plate.

According to the above configuration, it is possible to visually recognize the image formed by the image light emitted from the light exit surface at the predetermined viewpoint. That is, the image display unit can clearly display the image displayed on the image display in a space where there is no screen outside the image display unit.

The image display unit according to the embodiment of the present invention may be configured such that the image forming unit includes a collimating lens disposed between the image display and the incoming surface of the light guide plate and collimating the image light in the direction orthogonal to the longitudinal direction of the incoming surface.

Thus, the image display unit can clearly display the image displayed on the image display in a space where there is no screen outside the image display unit.

The image display unit according to the embodiment of the present invention may be configured such that the image display is disposed so that the image light is emitted in the longitudinal direction of the incoming surface, and the image forming unit includes a light guide member configured to propagate the image light which has been collimated in the longitudinal direction of the incoming surface and provided with a plurality of light path conversion units configured to emit the propagated light toward the incoming surface of the light guide plate by reflecting or refracting the propagated light.

According to the above configuration, the image display is arranged to emit the image light in the longitudinal direction of the incoming surface, whereby size reduction of the image forming unit can be achieved.

DESCRIPTION OF SYMBOLS 1A, 1B, 1C image display unit
2 driver's seat
3 passenger's seat
4 obstruction
10 imaging unit
11 image display device (image display)
12 image-forming lens (image forming unit)
13, 131 collimating lens (image forming unit)
14c light exit surface
14 light guide plate
14a, 132a incoming surface
14b bottom surface
132 light guide member
132b diffusion surface
132c outgoing surface
133 prism (light path conversion unit)
141 prism (emission structure unit)

The invention claimed is:
1. An image display unit comprising:
an imaging unit configured to capture an image of a space to be viewed;
an image display configured to display an image captured by the imaging unit in a display area in real time; and an image forming unit configured to form an image in a space where there is no screen, by projecting the image displayed by the image display,
wherein the image forming unit comprises a light guide plate comprising: an incoming surface on which image light from the image display is incident; and a plurality of emission structure units configured to allow the image light incident on the incoming surface to be emitted to an outgoing surface by reflecting or refracting the image light, the light guide plate receiving the image light collimated in a direction orthogonal to a longitudinal direction of the incoming surface,
each of the plurality of emission structure units allows light beams emitted from different positions in the display area in the direction orthogonal to the longitudinal direction of the incoming surface to be emitted toward a predetermined viewpoint from a light exit surface which is one surface of the light guide plate, and
the image light incident on the light guide plate is converted into convergent light in XY plane and is collimated in YZ plane, where a longitudinal direction of the incoming surface is defined as X direction, a normal direction of the incoming surface is defined as Y direction, and a normal direction of the light exit surface is defined as Z direction.

2. The image display unit according to claim 1, wherein the imaging unit captures an image of at least a part of a blind spot space hidden by an obstruction in a viewing direction of a viewer, and
the image forming unit is provided at a position in the obstruction where a gaze to the blind spot space in the viewing direction passes.

3. The image display unit according to claim 1, wherein the image forming unit forms the image in a space opposite to a viewer with respect to the image forming unit.

4. The image display unit according to claim 1, wherein the image display unit is used for vehicles.

5. The image display unit according to claim 4, wherein the imaging unit captures an image of a blind spot space hidden by a ceiling of a vehicle, and
the image forming unit is provided at a position in the ceiling where a gaze to the blind spot space in a viewing direction of a viewer passes.

6. The image display unit according to claim 4, wherein the imaging unit captures an image of a blind spot space hidden by a pillar inside a vehicle, and
the image forming unit is provided at a position in the pillar where a gaze to the blind spot space in a viewing direction of a viewer passes.

7. The image display unit according to claim 4, wherein the imaging unit captures an image of a blind spot space hidden by a dashboard inside a vehicle, and
the image forming unit is provided at a position in the dashboard where a gaze to the blind spot space in a viewing direction of a viewer passes.

8. The image display unit according to claim 4, wherein the imaging unit captures an image of a blind spot space hidden by a door of a vehicle, and
the image forming unit is provided at a position in the door where a gaze to the blind spot space in a viewing direction of a viewer passes.

9. The image display unit according to claim 4, wherein the imaging unit captures an image of a space on a side of a vehicle, and
the image forming unit is provided in a window of a door of the vehicle.

10. The image display unit according to claim 4, wherein the imaging unit captures an image of a space behind a vehicle, and
the image forming unit is provided at a position behind a driver's seat in the vehicle and between the driver's seat and a passenger's seat.

11. The image display unit according to claim 4, wherein the imaging unit captures an image of a space behind a vehicle, and
the image forming unit is provided at a position in front of a driver's seat in the vehicle and between the driver's seat and a passenger's seat.

12. The image display unit according to claim 1, wherein the image forming unit comprises a collimating lens disposed between the image display and the incoming surface of the light guide plate and collimating the image light in the direction orthogonal to the longitudinal direction of the incoming surface.

13. The image display unit according to claim 1, wherein the image display is disposed so that the image light is emitted in the longitudinal direction of the incoming surface,
the image forming unit comprises a light guide member configured to propagate the image light which has been collimated in the longitudinal direction of the incoming surface and comprising a plurality of light path conversion units configured to emit the propagated light toward the incoming surface of the light guide plate by reflecting or refracting the propagated light, and
the light guide member faces the incoming surface of the light guide plate.

* * * * *